(12) United States Patent
Gray

(10) Patent No.: US 11,292,949 B2
(45) Date of Patent: Apr. 5, 2022

(54) HEAT TRANSFER FLUID COMPOSITION AND USE

(71) Applicant: Kilfrost Group PLC, Haltwhistle (GB)

(72) Inventor: Philip Gray, Greenford (GB)

(73) Assignee: Kilfrost Group PLC, Haltwhistle (GB)

( * ) Notice: Subject to any disclaimer, the term of this patent is extended or adjusted under 35 U.S.C. 154(b) by 0 days.

(21) Appl. No.: 15/742,775

(22) PCT Filed: Jul. 14, 2016

(86) PCT No.: PCT/GB2016/052134
§ 371 (c)(1),
(2) Date: Jan. 8, 2018

(87) PCT Pub. No.: WO2017/009652
PCT Pub. Date: Jan. 19, 2017

(65) Prior Publication Data
US 2018/0362824 A1 Dec. 20, 2018

(30) Foreign Application Priority Data
Jul. 14, 2015 (GB) .................................... 1512303

(51) Int. Cl.
*C09K 5/20* (2006.01)
*C23F 11/08* (2006.01)
*C09K 5/10* (2006.01)
*C23F 11/12* (2006.01)
*C23F 11/14* (2006.01)

(52) U.S. Cl.
CPC .............. *C09K 5/20* (2013.01); *C09K 5/10* (2013.01); *C23F 11/08* (2013.01); *C23F 11/126* (2013.01); *C23F 11/149* (2013.01)

(58) Field of Classification Search
CPC ............ C09K 5/00; C09K 5/08; C09K 5/20
USPC ........................................................ 252/75
See application file for complete search history.

(56) References Cited

U.S. PATENT DOCUMENTS

| | | | |
|---|---|---|---|
| 1,878,903 A | 9/1932 | Smith | |
| 5,104,562 A * | 4/1992 | Kardos | C09K 5/20 252/75 |
| 5,922,745 A * | 7/1999 | McCarthy | A01N 43/80 424/405 |
| 5,993,684 A * | 11/1999 | Back | C09K 3/185 106/13 |
| 6,059,996 A | 5/2000 | Minks et al. | |
| 6,540,934 B2 * | 4/2003 | Sapienza | C09K 3/18 106/13 |
| 6,723,254 B1 * | 4/2004 | Starzmann | C09K 5/20 252/570 |
| 7,743,615 B2 * | 6/2010 | Malone | C09K 5/10 62/114 |
| 7,972,530 B2 * | 7/2011 | Wehner | A61Q 5/02 252/70 |
| 7,981,314 B2 * | 7/2011 | McCormick | C11D 3/3719 252/71 |
| 10,968,170 B2 * | 4/2021 | Kamenoue | C07C 305/10 |
| 2004/0040336 A1 | 3/2004 | Dick et al. | |
| 2006/0261305 A1 | 11/2006 | Ohike et al. | |
| 2007/0194270 A1 * | 8/2007 | Malone | C09K 5/10 252/67 |
| 2007/0194280 A1 * | 8/2007 | Saitoh | C09K 11/7734 252/301.4 R |
| 2008/0048147 A1 | 2/2008 | Eaton | |
| 2008/0315152 A1 | 12/2008 | Daly | |
| 2021/0189214 A1 * | 6/2021 | Lee | C23F 11/181 |

FOREIGN PATENT DOCUMENTS

| | | |
|---|---|---|
| EP | 0229440 A1 | 7/1987 |
| JP | S59232045 A | 12/1984 |
| JP | H10251622 A | 9/1998 |
| WO | WO-9626990 A1 | 9/1996 |

OTHER PUBLICATIONS

Puetz, Christine, "International Search Report," prepared for PCT/GB2016/052134, as dated Oct. 14, 2016, four pages.
Database WPI, Week 198507, Thomson Scientific, London, GB, AN 1985-040571, XP002762493, Dec. 26, 1984.
Melinder, A., "Update on Secondary Refrigerants for Indirect Systems," Jan. 2000.
Hersch, P., et al., "An Experimental Survey of Rust Preventatives in Water II. The Screening of Organic Inhibitors," Journal of Applied Chemistry, vol. 11, Jul. 1961, pp. 251-265.
Tyforop Chemie GmbH, Tyfoxit F15-F50, "High-performance Ultra Low Viscous Secondary Refrigerants for Applications Down to -50C," 2013.
Tyforop Chemie GmbH, Tyfoxit F15-F50, "Ready-to-Use High-Performance Ultra Low Viscous Secondary Refrigerants for Applications Down to -50C," 2015.

* cited by examiner

*Primary Examiner* — Jane L Stanley
(74) *Attorney, Agent, or Firm* — Winstead PC

(57) ABSTRACT

The present invention provides a real, commercially viable alternative to known heat transfer fluids which exhibits essentially the same or improved viscosity profiles and avoids the corrosion problems. The present invention relates to a heat transfer fluid composition comprising between 10 to 80% by weight of a corrosion inhibitor and freeze point depressant dual function agent, and a viscosity reducing agent. Also disclosed are aqueous based heat transfer fluid products and their use in various heating and/or cooling systems.

32 Claims, 4 Drawing Sheets

| Formulation | Formulation Details (%w/w) | | | | | | | | | |
|---|---|---|---|---|---|---|---|---|---|---|
| | Glycerol | Potassium Formate | Sodium Acetate | Sodium Propionate | Corrosion Inhibitor Solution | PDO | MPG | MEG | Sulfamic Acid | Water |
| KF001 | 0 | 15.6 | 0 | 0 | 6.5 | 0 | 77.9 | 0 | 0 | 0 |
| KF002 | 0 | 15.6 | 0 | 0 | 13.0 | 0 | 71.4 | 0 | 0 | 0 |
| KF003 | 0 | 19.8 | 0 | 0 | 11.3 | 28.2 | 36.9 | 0 | 0 | 3.8 |
| KF004 | 67.7 | 14.9 | 0 | 0 | 12.4 | 0 | 0 | 0 | 0 | 5.0 |
| KF005 | 36.9 | 19.8 | 0 | 0 | 11.3 | 28.2 | 0 | 0 | 0 | 3.8 |
| KF006 | 0 | 0 | 13.30 | 0 | 6.53 | 0 | 80.17 | 0 | 0 | 0 |
| KF007 | 36.9 | 0 | 0 | 19.8 | 11.3 | 28.2 | 0 | 0 | 0 | 3.8 |
| KF008 | 36.9 | 9.9 | 0 | 9.9 | 11.3 | 28.2 | 0 | 0 | 0 | 3.8 |
| KF009 | 36.9 | 3.9 | 0 | 15.9 | 11.3 | 28.2 | 0 | 0 | 0 | 3.8 |
| KF010a | 36.7 | 19.7 | 0 | 0 | 11.2 | 28.1 | 0 | 0 | 0 | 4.3 |
| KF010b | 36.7 | 19.7 | 0 | 0 | 11.2 | 28.1 | 0 | 0 | 0.5 | 3.8 |
| KF011 | 36.7 | 19.7 | 0 | 0 | 11.2 | 0 | 0 | 28.1 | 0.5 | 3.8 |
| KF012 | 0 | 19.7 | 0 | 0 | 11.3 | 28.2 | 36.7 | 0 | 0.50 | 3.6 |
| KF013 | 0 | 19.7 | 0 | 0 | 11.3 | 28.2 | 36.7 | 0 | 1.0 | 3.1 |
| KF014 | 30.5 | 26.0 | 0 | 0 | 11.2 | 28.1 | 0 | 0 | 0.5 | 3.7 |
| KF015 | 26.5 | 30.0 | 0 | 0 | 11.2 | 28.1 | 0 | 0 | 0.5 | 3.7 |
| KF016 | 24.0 | 32.5 | 0 | 0 | 11.2 | 28.1 | 0 | 0 | 0.5 | 3.7 |

Figure 1

| Table 8: Comparison of the biological fouling resistance of KF004 and KF010 with a standard glycerol solution ||||||||
|---|---|---|---|---|---|---|---|
| Sample | Description | Inoculation 1 | Inoculation 2 | Inoculation 3 | Inoculation 4 | Inoculation 5 | Inoculation 6 |
| A | 25 % v/v Glycerine in water | +++ BMY | - | - | - | - | - |
| B | KF004 25 % v/v dilution in water | - | - | - | - | ++ M | ++ M |
| C | KF0010b 25% v/v dilution in water with 0.05% w/w Parmetol MBX® Preservative added | - | - | - | - | - | - |
| D | MPG based HTF reference at 25 % v/v in water with 0.05% w/w Parmetol MBX® Preservative added | - | - | - | - | - | - |

B = Bacteria   - = free of growth
M = Mould   + = slight growth
Y = Yeast   ++ = moderate growth
+++ = heavy growth

Figure 3

HEAT TRANSFER FLUID COMPOSITION AND USE

FIELD OF THE INVENTION

The present invention relates to a heat transfer fluid composition, and its use. In particular the present invention relates to a heat transfer fluid composition comprising between 10 to 80% by weight of a corrosion inhibitor and freeze point depressant dual function agent, and a viscosity reducing agent. More especially the corrosion inhibitor and freeze point depressant dual function agent is selected from one or more of the following; glycerol, polyglycerol, trimethylglycine (TMG/Betaine), sorbitol, xylitol, maltitol, and/or lactitol. Such compositions especially find utility, once optionally diluted, in ground source heating systems, secondary refrigeration unit systems, chiller systems, and in heating, ventilating and air conditioning (HVAC) systems.

BACKGROUND OF THE INVENTION

Heat transfer fluids find application in numerous systems, including but not limited to, heating and ventilation, secondary refrigeration, chemical processing, food and beverage production and solar thermal heating. A large number of heat transfer fluids have been documented and commercialised using a wide variety of base fluids and performance additives. The heat transfer fluid selected for use in any given system will have a significant impact on the operational efficiency and longevity of that system in which it operates.

Generally speaking, heat transfer fluids provide two functional roles; the first role is to transfer heat energy efficiently, and the second role is that the heat transfer fluid should not degrade the system within which it is used, or be degraded itself during use.

The first role, heat transfer efficiency, is dependent on the thermo-physical properties of the fluid. These properties include specific heat capacity, thermal conductivity, density and fluid viscosity. In addition, the hydraulic performance of a heat transfer fluid is also an important feature which can affect the efficiency of heat transfer. A heat transfer fluid must remain pumpable over the temperature range that it is to be circulated at within a given system, i.e. the heat transfer fluid must be suited, and hence selected to suit, a particular working temperature range when in use. The hydraulic performance of a heat transfer fluid is almost entirely determined by its viscosity profile and how this varies with circulation temperature. In general, the lower the viscosity of a heat transfer fluid the lower the pressure drop along a fixed length of pipe, resulting in less energy required to pump the fluid. In addition, in order to maximise heat transfer efficiency within a system, turbulent flow of a fluid is preferred. In a system of fixed pipe radius, pipe length and pump size, turbulent flow becomes increasingly difficult to achieve as the viscosity of the circulating fluid increases. In some cases, the viscosity of the heat transfer fluid may be so high as to make the attainment of turbulent flow impractical due to the additional demand on the pump and the exceptionally high pressure drops developed within a system. A comprehensive summary of the different types of heat transfer fluid and a comparison of their thermo-physical properties and overall efficiency can be found in "Update on Secondary Refrigerants for Indirect Systems" by A. Melinder, 1997b, *Thermophysical properties of liquid secondary refrigerants, Charts and Tables*, Stockholm, Swedish Society of Refrigeration.

The second role of a heat transfer fluid, as stated above, is that it should not degrade the system it is in, nor be degraded itself in use. This means that it needs to protect the metallic and elastomeric components within a system from corrosion and biological fouling when in use. In addition, the heat transfer fluid itself should be resistant to both oxidative and biological degradation. The long term corrosion protection a particular heat transfer fluid provides can be readily determined using industry standard test methods. One particularly challenging and widely used test within the industry is the ASTM-D1384-05 corrosion testing protocol, originally developed to determine the corrosion resistance offered by engine coolants. In this test metal coupons are immersed in a diluted solution of the heat transfer fluid and heated to 88° C. for a period of two weeks whilst compressed air is passed through the solution. The test is designed to promote corrosion and oxidative degradation of the fluid. At the end of the test the extent of corrosion is determined through weight loss measurements and the level of oxidative degradation of the fluid can be determined by simple analytical techniques such as pH and refractive index (RI) measurements. The method for assessing performance requirements for engine coolants is described in ASTM-D1384-05 and the standard set (i.e. the corrosion limitations) are further defined in ASTM-D3306-10. However, for simplicity, this text will mainly refer to the ASTM-D1384-05 method as a shorthand way of implying both.

Water is an excellent carrier of heat energy due to its high specific heat capacity, high thermal conductivity and low viscosity. In addition it is non-toxic, widely available and environmentally benign. In consequence water is an excellent candidate base chemical for heat transfer fluids. Such heat transfer fluids are referred to as aqueous-based heat transfer fluids. A significant limitation on the use of water as a heat transfer fluid is that it freezes at a relatively high temperature of 0° C., making is unsuitable for many system uses. In addition, aqueous-based heat transfer fluids are naturally corrosive and can cause significant damage to the systems in which they operate. In order to circumvent these limitations and make use of the exceptional heat transfer capabilities of water a large number of heat transfer fluids have been developed in which freeze point depressants are added to the water to depress the freeze point. In addition, in order to control corrosion, a number of additives have been utilised in aqueous-based heat transfer fluids; for example, the use of salts of organic inhibitors in aqueous solutions is disclosed by Hersch P., et al., "An Experimental Survey of Rust Preventatives in Water—II. The Screening of Organic Inhibitors", *Journal of Applied Chemistry*, vol 11, 1961, pp 254-255.

Mono ethylene glycol (MEG) is a common freeze point depressant for use in aqueous-based heat transfer fluids, as it is able to provide heat transfer efficiency even at low temperatures due to its relatively low viscosity at sub-zero temperatures, as compared to other known polyhydric alcohols. However, MEG is toxic by ingestion which limits its usage in systems where contact with food, sanitary waters or a pharmaceutical product is a possibility. In consequence, the use of non-toxic but less efficient monopropylene glycol (MPG) and propane-1,3-diol (PDO) based heat transfer fluids is widespread. At circulation temperatures significantly below 0° C., both MPG and PDO based heat transfer fluids suffer from poor hydraulic performance due to the rapid viscosity rise observed. This makes such fluids increasingly difficult to pump, increasing power consumption and reducing efficiency. For certain applications, in systems where the heat transfer fluid is circulated at low temperatures, such as in ground source heating and secondary refrigeration units, the loss of efficiency can be significant and such systems must be designed accordingly to deal with the poor hydraulic performance of such fluids.

Furthermore, in order to overcome the inherent corrosive nature of aqueous polyhydric alcohol solutions, such as those mentioned above, a number of additives have been utilised, including the salts of organic acids, triazoles, nitrites, nitrates, silicates, phosphates, amides, amines and molybdenates. As such, it is known that polyhydric alcohol based fluids may be improved by the inclusion of such additives to provide long term corrosion protection for the systems in which they operate, demonstrated by passing the ASTM D1384-05 corrosion test with minimal impact on the test metal coupons.

For example, in European Patent Publication No. 0229440, there is disclosed heat transfer fluid compositions based on polyhydric alcohols, suitably ethylene glycol, in combination with a number of organic and inorganic corrosion control additives. Extensive testing is conducted on these compositions in order to demonstrate their effectiveness at controlling corrosion. The full ASTM D1384-05 testing protocol was employed and a limited number of the compositions provided in this disclosure passed this test in its full form.

Aqueous solutions of the salts of organic acids, such as potassium and sodium formates, acetates, succinates and propionates are also widely documented freeze point depressants used in aqueous-based heat transfer fluids. A particular advantage of these salt solutions over the polyhydric alcohol solutions, mentioned above, is that they have significantly lower viscosities at relatively low circulation temperatures leading to improved hydraulic and heat transfer performance when in use in a system. However, long term multimetal corrosion protection is difficult to ensure with such compositions. In particular, the use of soft solder is to be avoided due to the rapid deterioration of this metal in such salt solutions. In addition, heat transfer fluids based on such salt solutions suffer from restrictive usage temperature ranges and rigorous requirements for de-aeration on installation. In some cases the use of only stainless steel in systems in which the heat transfer fluid is to be installed is also a requirement, particularly if the fluid is to be thermally cycled.

A large number of aqueous-based heat transfer fluids using the salts of organic acids, which include but are not limited to, potassium and sodium formates, acetates, succinates and propionates, in combination with corrosion control agents such as the salts of organic acids, triazoles, nitrites, nitrates, silicates, phosphates, amides, amines and molybdenates have been documented and commercialised. In order to determine the level of corrosion protection on offer, a number of techniques and test methods have been utilised, including variants on the ASTM-D1384-05 corrosion test protocol. In such variants, the aqueous-based heat transfer fluid is tested at higher concentrations than the 33% v/v dilution the test method specifies. In addition, some tests are conducted at lower temperatures than the 88° C. specified by the test method and in the absence of certain metal test coupons (such as soft solder). As a consequence, the level of corrosion protection determined do not match up to the challenging standard used within the industry and determined by the ASTM-D1384-05 method.

For example, in U.S. Pat. No. 6,059,996, there is described a low viscosity aqueous coolant based on inhibited metal acetates and/or formates. Although good corrosion protection is reported for the undiluted compositions with respect to cast iron, aluminium, copper, brass and steel, no data was reported for soft solder. In addition, when the compositions were tested diluted, as required by the full ASTM D1384-05 corrosion testing protocol, significant corrosion was seen with all metals.

Commercially available heat transfer fluids based on the salts of organic acids such as formates, acetates and propionates cannot be used in mixed metal systems at as wide an operating temperature range as heat transfer fluids based on polyhydric alcohols. For example, on the product literature of the potassium formate based heat transfer fluid Antifrogen KF®, commercialised by Clariant, the use of stainless steel is recommended for systems in which the fluid is to be diluted to 31% v/v. In addition, the corrosion test data reported is that obtained from testing on the undiluted product whereas the ASTM-D1384-05 corrosion testing protocol should be conducted on a diluted sample of heat transfer fluid.

Another example of the limitations of the currently commercially available heat transfer fluids based on aqueous salt solution can be seen with the Tyfocor product Tyfoxit F15-F50®. The corrosion testing conducted and reported in the product literature for this product has been completed using a higher concentration of heat transfer fluid than specified by the ASTM D1384-05 corrosion test method. In addition, the product literature also states that the use of soft solder should be avoided in systems in which the products are to be used. Most importantly, the literature states that the highest temperature that systems containing the fluid should be exposed to for any significant period of time is +20° C. Similar limitations are placed on the commercially available potassium acetate based heat transfer fluids known as Tyfoxit 1.15-1.25°.

In summary, no commercially available or documented heat transfer fluid based on the salts of organic acids such as potassium/sodium formates, acetates or propionates has passed the full ASTM-D1384-05 corrosion testing protocol to the standard of ASTM-D3306-10 protocol for all metals providing system protection comparable to compositions based on the polyhydric alcohols.

At present the industry has two main choices of aqueous-based heat transfer fluids for low temperature (sub-zero) applications. The first choice is aqueous solutions of polyhydric alcohols, such as mono ethylene glycol or mono propylene glycol. These fluids can be formulated to provide excellent system protection against corrosion for a wide range of metals for extended periods over a wide operating temperature range. However, such fluids suffer from high viscosities at low temperatures, reducing heat transfer efficiency significantly and in some cases to levels so low as to preclude their use. In addition, in some cases where the use of the most efficient polyhydric alcohol solution (i.e. mono ethylene glycol) is precluded due to its high mammalian toxicity, the use of the alternative mono propylene glycol based heat transfer fluids can have significant design implications on pipe and pump sizing in order to achieve acceptable heat transfer efficiency. The second choice—aqueous solutions of organic salts which may include, potassium and sodium formates, acetates, succinates and propionates, offer much more favourable viscosities at low temperatures, remaining pumpable throughout the entirety of their specified operational temperature range, providing system efficiency through improved hydraulic performance. However, with such salt solutions, multimetal corrosion and system protection meeting the same standard as that offered by polyhydric alcohol solutions is not possible. In addition, such solutions have a tendency to "leak" from systems due to their low surface tension.

In light of the problems highlighted above, there is still a need in the industry to develop heat transfer fluids which provide a real alternative to use of the toxic mono ethylene glycol, whilst providing improved heat transfer and hydraulic performance at low circulating temperatures, with the same (relative to mono ethylene glycol based fluids) or improved level of corrosion protection and with the same (relative to mono ethylene glycol based fluids) or improved level of freeze protection.

SUMMARY OF THE INVENTION

The present invention looks to overcome the problems identified above by way of providing a heat transfer fluid composition comprising between 10 to 80% by weight of a corrosion inhibitor and freeze point depressant dual function agent, and a viscosity reducing agent.

More especially the present invention looks to provide a real commercially viable alternative to the toxic mono ethylene glycol containing heat transfer fluids presently available, and hence provide a lower toxicity profile, whilst still maintaining a viscosity profile essentially the same as or better than the technically preferred mono ethylene glycol based products.

In addition, the present invention looks to avoid the corrosion problems associated with typical salts of organic acids, currently encountered with other suggested alternatives to mono ethylene glycol, which prevent such fluids from being viable commercial products in multimetal systems especially.

For applications in which the use of toxic mono ethylene glycol based aqueous heat transfer fluids is precluded, the present invention provides compositions based on both non-toxic compositions which offer improved hydraulic and heat transfer efficiency than previously documented or commercialised mono propylene glycol or other glycol based non toxic alternatives to mono ethylene glycol based heat transfer fluids.

In accordance with a first aspect of the present invention there is provided a heat transfer fluid composition comprising between 10% to 80% by weight of a corrosion inhibitor and freeze point depressant dual function agent, and a viscosity reducing agent. The inventors of the present invention have surprisingly identified a number of agents which are able to function as both; 1) freeze point depressants, rendering the present heat transfer fluids suitable for use in sub-zero systems, and 2) as corrosion inhibitors in and of themselves, to some extent (although optimisation of corrosion inhibition will most likely be necessary for most commercial uses in metal systems). As such it should be understood that the term "corrosion inhibitor and freeze point depressant dual function agent" relates to a single agent or component in the heat transfer fluid composition which is able to provide both of these functions, although it is envisaged that one or more such agents may be provided in a heat transfer fluid in accordance with the present invention to provide optimised performance or cost benefits.

Preferably said corrosion inhibitor and freeze point depressant dual function agent is selected from one or more of the following; glycerol, polyglycerol, trimethylglycine (also referred to as TMG or betaine), sorbitol, xylitol, maltitol, and/or lactitol. These materials have surprisingly been found to provide both freeze point and corrosion inhibition functions, suitable for use in heat transfer fluids. The corrosion inhibitor and freeze point depressant dual function agent may comprise one or both of glycerol and trimethylglycine, these two agents provide the viscosity profiles and solubility most preferred for use in heat transfer fluids. More preferably said corrosion inhibitor and freeze point depressant dual function agent comprises glycerol, which in some embodiments has cost and performance benefits over the other identified dual function agents. Additionally, it should be noted that glycerol shows high levels of biodegradability with a low biochemical oxygen demand on degradation. In consequence, heat transfer fluids of the present invention comprising glycerol also shows a higher level of biodegradability with a lower biochemical oxygen demand on degradation than standard mono propylene glycol or propane-1,3-diol based heat transfer fluids making them a more environmentally friendly option.

Said corrosion inhibitor and freeze point depressant dual function agent may be present at from 20% to 80% by weight of the composition, preferably from 20% to 70% by weight and optionally from 30% to 70% by weight or from 30% to 40% by weight.

Said viscosity reducing agent can be understood to be a viscosity modifier, which affects the heat transfer composition in such a way as to reduce the viscosity of a comparable composition where no viscosity reducing agent is present. Preferably said viscosity reducing agent is present in the heat transfer composition at a level of between about 3% to 70% by weight, for example, from 10% to 50% by weight. In some embodiments, the viscosity reducing agent may preferably be present at a level of from 10% to 25% by weight, for example in embodiments in which a diol is present in the composition (as discussed in further detail below). In alternative embodiments, the viscosity reducing agent may preferably be present in the composition at a level of from 25% to 50% by weight. More preferably the viscosity reducing agent is selected from sodium or potassium formate, an acetate, a propionate, a chloride brine, or a mixture thereof. Most preferably said viscosity reducing agent is potassium formate or sodium acetate. Potassium formate is particularly preferred in some compositions for which it has been found to give the best viscosity profile and formulation stability. Typically potassium formate may be present in a 75% aqueous solution.

The presence of the viscosity reducing agent allows for optimisation of the viscosity of the present heat transfer fluid to render it suitable for its specific intended use. However, the fact that these viscosity reducing agents are being used in combination with the one or more corrosion inhibitor and freeze point depressant dual function agents identified by the present invention means that the known corrosive nature of such viscosity reducing agents are mitigated. Formally, the use of organic salt viscosity modifiers such as formates, succinates and propionates, in particular, in aqueous based heat transfer fluids have been believed to be especially unsuitable for use in multimetal systems due to the levels of corrosion resulting from their use. The inventors of the present inventions have surprisingly found that use of such organic salt viscosity reducing agents in multimetal systems is possible, without detrimental levels or corrosion being observed, when a corrosion inhibitor and freeze point depressants as described above, is employed in the heat transfer fluid composition.

In addition, suitably, the viscosity reducing agent is also able to function as a freeze point depressant, further improving the utility of the heat transfer fluid according to this embodiment of the invention in relation to systems where low operating temperatures are required. As such, preferably the viscosity reducing agent may be a dual function viscosity reducing agent and freeze point depressant agent; preferably such a dual function viscosity reducing agent and freeze point depressant agent is potassium formate.

Advantageously, a heat transfer fluid composition in accordance with the first embodiment of the present invention, as provided above, has been found to have similar or improved hydraulic efficiency to that of a standard, toxic mono ethylene glycol (MEG) containing heat transfer fluids. Furthermore, it has been found that the lower viscosity of the heat transfer fluid of the present invention does not come at the expense of freeze protection when compared to existing compositions based on mono-propylene glycol (MPG), propane-1,3-diol or glycerol in the absence of the viscosity reducing agent. This aspect of the present invention will be further discussed below.

Additionally, the heat transfer fluid composition may preferably comprise a sulfamic acid salt. Suitably, said sulfamic acid salt is present in the heat transfer fluid composition at a level of about between 0.1% to 5% by weight sulfamic acid salt, for example, 0.5% to 2% by weight. During manufacture, sulfamic acid is added to the formulation but through interaction with other components of the formulation, it is a salt of sulfamic acid which is present in the resulting heat transfer fluid composition. Accordingly, the sulfamic acid salt may contain any cation but in some situations the sodium salt of sulfamic acid is preferred to meet solubility requirements. The presence of a sulfamic acid salt is preferred as the sulfamate anion further improves the corrosion protection of the composition, which is especially preferred where the heat transfer fluid is to be utilised in a ferrous metal containing system. Additionally, the addition of sulfamic acid, and therefore presence of a sulfamic acid salt, is particularly preferred when potassium formate is utilised as the viscosity reducing agent, as the sulfamate anion has been found to negate the corrosive effects of the potassium formate more effectively than the presence solely of the said corrosion inhibitor and freeze point depressant dual function agent in certain embodiments.

Additionally, or alternatively, the heat transfer fluid composition may further comprise a diol, and more preferably between 10% to 35% by weight diol, optionally from 20% to 30% by weight. The presence of a diol has been found in some situations to further improve the viscosity profile of the heat transfer fluids of the present invention, rendering them suitable for use in a wider range of systems.

Preferably, said diol is selected from one or more of the following; propane-1,3-diol (PDO), propane-1,2-diol (MPG), ethylene glycol (MEG), diethylene glycol (DEG), triethylene glycol (TEG), dipropylene glycol (DPD) or tripropylene glycol (TPG). More preferably said diol is selected from propane-1,3-diol, or propane-1,2-diol. Most preferably the diol is propane-1,3-diol, as it has a low toxicity and will provide enhanced viscosity profiles especially suited to use in some systems, especially those where release of toxic material to the environment (such as ground source heating systems) would make the use of the more toxic MEG less attractive.

Most preferably, the heat transfer fluid composition comprises glycerol, (as the corrosion inhibitor and freeze point depressant dual function agent) and potassium formate (as the viscosity reducing agent). In some embodiments, the heat transfer fluid composition further comprises PDO. Such compositions have been surprisingly found to have advantageous viscosity profiles, with a viscosity drop observed which is unexpected. The reason for this is not yet understood, but the presence of these components appears to have a synergistic effect on viscosity drop without compromising corrosion protection.

Additionally, or alternatively, the heat transfer fluid composition may comprise one or more corrosion inhibitor. It should be understood that this corrosion inhibitor is in addition to the presence of said corrosion inhibitor and freeze point depressant dual function agent; the addition of this further corrosion inhibitor to further optimise and improve the heat transfer fluid of the present invention, in particular to ensure that compositions are optimised for use in specific systems (i.e. ferrous or multimetal systems) which may still exhibit corrosion over prolonged periods of use of a heat transfer fluid. Most preferably the heat transfer fluid composition comprises between 1% to 15% by weight one or more corrosion inhibitor, for example from 2% to 7% by weight one or more corrosion inhibitor or from 3% to 6% by weight one or more corrosion inhibitor.

Suitably, the one or more corrosion inhibitor comprises one or more of the following;

a yellow metal protector (to protect against corrosion of copper and brass) selected from a triazole derivative, optionally selected from, benzotriazole, tolytriazole, mercaptobenzotraizole, or a mixture thereof, a first ferrous metal corrosion inhibitor (to protect against corrosion of cast iron and mild steel), selected from a long chain carboxylic acid salt, optionally selected from, decanedioic acid (sebacic acid), octanoic acid (caprylic acid), nonanoic acid (pelargonic acid), isononanoic acid, 2-ethyl hexanoic acid, benzoic acid, or a mixture thereof, a second ferrous metal corrosion inhibitor (to protect against corrosion of cast iron and mild steel), selected from a mineral inhibitor, optionally selected from nitrate salts, nitrite salts, dipotassium phosphate, or a mixture thereof, an aluminium metal corrosion inhibitor (to protect against corrosion of aluminium), selected from a pH buffer, optionally selected from a secondary amine, a tertiary amine, long chain carboxylic acids, a secondary or tertiary amine salt, or a mixture thereof.

Such corrosion inhibitors are known in the art, and the skilled person should be able to select a suitable corrosion inhibitor based on their knowledge of the system the heat transfer fluid is to be used in. However, there is provided below, some specific examples of corrosion inhibitor blends that have been found to be particularly well suited to the intended uses of the present invention.

Preferably, and most suitably, the heat transfer fluid composition will have a pH of between 8.5 and 9.5. Use of a heat transfer fluid composition at a pH above this preferred pH range may result in accelerated corrosion of some metals such as aluminium. The pH of the composition may be achieved due to the nature of the constituent parts of the composition, or may be achieved via the addition of a further component.

Additionally, or alternatively, the heat transfer fluid composition may comprise an additional pH control agent. It should be noted that this pH control agent is distinct to the pH buffers referred to above in relation to the one or more corrosion inhibitor. Preferably said additional pH control agent is sodium hydroxide, or potassium hydroxide.

Additionally, or alternatively, the heat transfer fluid composition may further comprise triethanolamine (TEA). TEA is a particularly preferred buffer which protects the composition from change over a period of use in a system.

In addition, the present invention also looks to overcome the biological fouling problems which may be associated with the use of heat transfer fluids based on a corrosion inhibitor and freeze point depressant dual function agent selected from one or more of the following; glycerol, polyglycerol, trimethylglycine (also referred to as TMG or betaine), sorbitol, xylitol, maltitol, and/or lactitol. More especially, hitherto, the skilled person has been prejudiced from the inclusion of glycerol as a heat transfer fluid in systems due to perceived problems associated with biological fouling. However, it has surprisingly been found that the present compositions do not suffer from unacceptable biological fouling issues. Optionally, however, the heat transfer composition may further comprise a biocide. The inclusion of a biocide may improve the compositions resistance to biological fouling over prolonged periods of time during use. Most preferably, the biocide consists of benzisothiazolone (BIT), methylisothiazolon (MIT) and bis(3 aminopropyl) dodecylamine (BDA). A suitable biocide material is known as Parmetol MBX®, available from Schulke & Mayr GmbH, Norderstedt, Germany.

Most preferably, the heat transfer fluid composition according to the present invention may comprise:
10-80% by weight of glycerol
10-70% by weight of 75% potassium formate aqueous solution
0-35% by weight of propane-1,3-diol
0.1-5% by weight of sulfamic acid, in the form of a sulfamic acid salt
1-15% by weight of corrosion inhibitors
0-2% by weight of triethanolamine
0-10% by weight additional pH control agent selected from sodium hydroxide or potassium hydroxide
0-0.4% by weight of a biocide In some embodiments, the heat transfer composition according to the present invention may comprise:
30-70% by weight of glycerol
25-50% by weight of 75% potassium formate aqueous solution
0.1-2% by weight of sulfamic acid, in the form of a sulfamic acid salt
2-10% by weight of corrosion inhibitors
0.1-2% by weight of triethanolamine
0-10% by weight additional pH control agent selected from sodium hydroxide or potassium hydroxide
0-0.4% by weight of a biocide.

In alternative embodiments, the heat transfer composition according to the present invention may comprise:
30-40% by weight of glycerol
10-20% by weight of potassium formate (10-30% by weight of 75% potassium formate aqueous solution)
20-35% by weight of propane-1,3-diol
0.5-2% by weight of sulfamic acid, in the form of a sulfamic acid salt
3-6% by weight of corrosion inhibitors
0.1-2% by weight of triethanolamine
8.5-10% by weight additional pH control agent selected from sodium hydroxide or potassium hydroxide
0.1-0.4% by weight of a biocide Surprisingly, compositions in accordance with the embodiments given above, which provide specific combinations of corrosion inhibitor and freeze point depressant dual function agent, viscosity reducing agent, corrosion inhibitors and biocide, deliver significantly lower viscosities at low circulating temperatures whilst maintaining the exceptional corrosion protection for those metals tested for in the ASTM-D1384-05/ASTM-D3306-10 corrosion testing protocol. As such, compositions according to embodiments of the present invention are particular suited for use in multimetal systems (where corrosion optimisation is highly important), and in ground heat source systems (where limitation of toxicity is highly important). More over, the compositions provided by the particularly preferred embodiments detailed above, provide heat transfer compositions with a wide reach in terms of potential end uses. More especially, this particular embodiment of the heat transfer fluid composition provides improved corrosion protection, wider metal compatibility and a wider long term operational usage temperature range than existing formate, acetate and propionate containing compositions. Another advantage of this heat transfer fluid composition, when compared to standard MPG and propane-1,3-diol based compositions, is that it has a superior ecological profile with a lower biochemical oxygen demand posing a lower risk to aquatic systems on accidental spillage.

Additionally, or alternatively the heat transfer fluid composition may optionally comprise an additional scale reducer. Suitable additional scale reducers may include, but are not limited to, phosphonates and polycarboxylates; alternative additional scale reducer agents will be known to the person skilled in the art.

Additionally, or alternatively, the heat transfer fluid composition may optionally comprise an additional thermal stabiliser. Suitable additional thermal stabilisers may include, but are not limited to, butylated hydroxyl toluene (BHT) and other known radical scavengers; alternative additional thermal stabiliser agents will be known to the person skilled in the art.

In some embodiments, the heat transfer fluid compositions of the present invention may further comprise an antifoaming agent such as Xiameter AFE-1510. Other antifoaming agents suitable for use in the compositions will be known to the person skilled in the art.

In accordance with a further aspect of the present invention there is provided an aqueous-based heat transfer fluid product, comprising the heat transfer fluid composition as described in any embodiment above and water. Suitably, heat transfer fluids are manufactured and supplied commercially as a concentrated fluid, which is further diluted, usually on site of use, prior to use in a system. Most preferably the aqueous-based heat transfer fluid product comprises 20% and 60% by volume heat transfer fluid composition.

Furthermore, the present invention will find use in numerous applications and systems, including but not limited to, ground source heating, air source heating, secondary refrigeration, process heating and cooling, heating and ventilation systems. The invention offers improved heat transfer efficiency compared to currently available heat transfer fluid compositions, particularly those that are intended for use in systems where both heat transfer and freeze protection is required. In addition, for systems which currently operate on toxic MEG based heat transfer fluid compositions the present invention offers a viable alternative, with significantly lower mammalian toxicity.

Therefore, in accordance with a further aspect of the present invention, there is provided use of an aqueous-based heat transfer product, as described above, in a ground source heating system. Above, there is noted a number of particularly preferred embodiments for this specific intended use, particularly related to the toxicity of the heat transfer fluid composition.

Additionally, or alternatively, use of an aqueous-based heat transfer product as described above in a secondary refrigeration unit system is also contemplated as one aspect of the present invention.

Additionally, or alternatively, use of an aqueous based heat transfer product as described above in a chiller system is also provided.

Additionally, or alternatively, use of an aqueous based heat transfer product as described above in a heating, ventilating and air conditioning (HVAC) system is also provided.

As will be appreciated, the features of the preferred embodiments of the first aspect of the present invention apply mutatis mutandis to the further aspects of the present invention.

Embodiments of the present invention are now described in more detail with reference to non-limiting examples and comparative data. A number of Tables and Figures are provided, of which;

FIG. 1 is a table providing details of experimental heat transfer fluids.

FIG. 3 is a table (Table 8) providing comparison of the biological fouling resistance of two heat transfer fluids in accordance with the present invention versus a standard glycerol solution.

EXAMPLES

Figure 2:
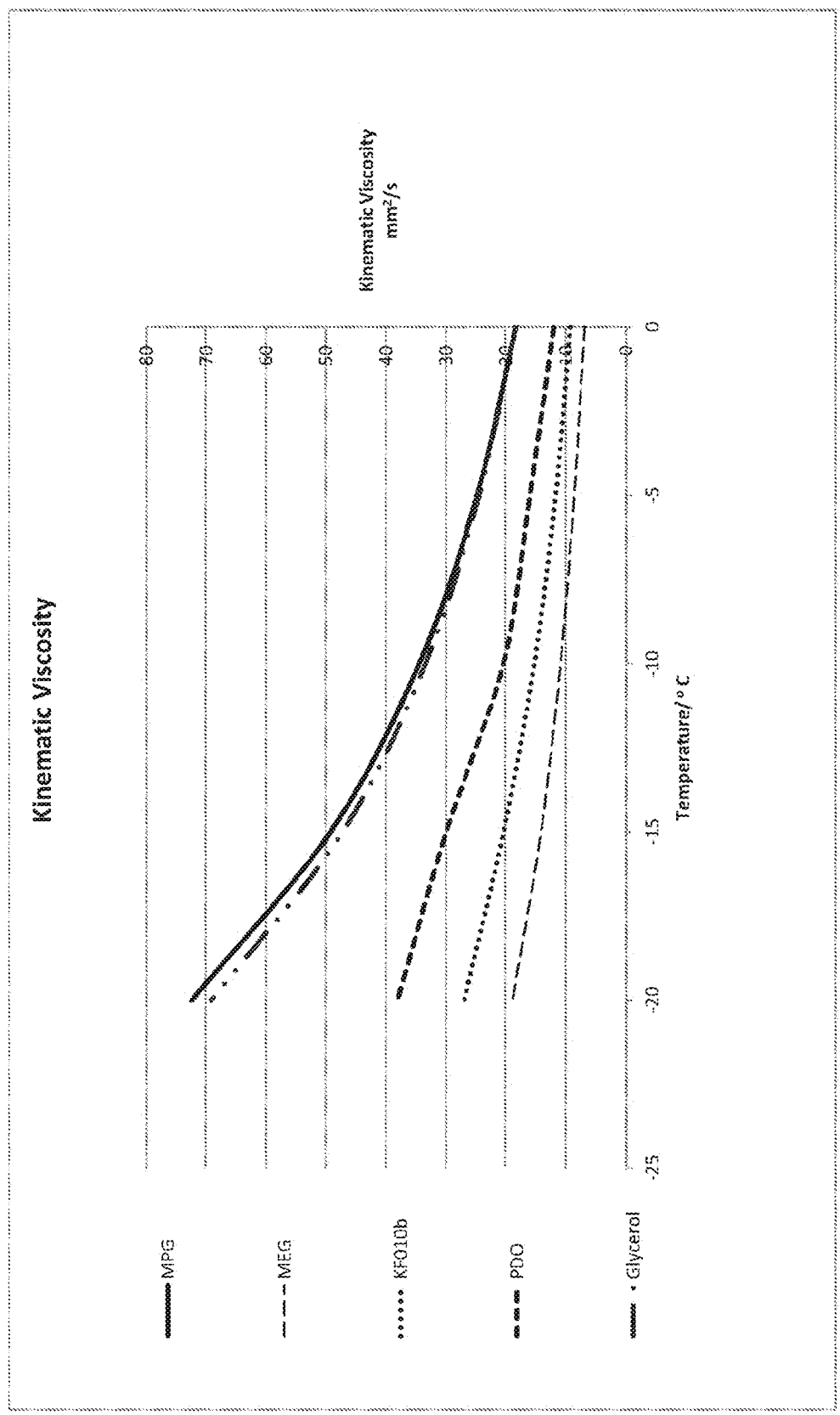
FIG. 2 is a graph showing kinematic viscosity observed for a number of agents.

Reference to w/w % should be understood to refer to weight by weight percentage.

A series of heat transfer fluid compositions, as detailed below, were prepared and tested for the following;
1. Composition Stability—The stability of compositions was determined using thermal cycling between 20° C. and −10° C. The compositions were inspected for turbidity and the presence of undissolved solids. In particular, 50% v/v dilutions of the compositions were made up with de-ionised water and placed in the freezer at −10° C. and incubated at ambient 20° C. for a specified period of time. The solutions were inspected for clarity and presence of undissolved solids before and after each test.
2. Viscosity Profile—The viscosity profile of compositions were determined at a range of temperatures using an Anton-Parr viscometer.
3. Corrosion Protection—particularly preferred heat transfer fluid compositions in accordance with the present invention were tested according to the ASTM-D1384-05 corrosion testing method to the ASTM-D3306-10 standard, in which a rack of metal coupons were immersed in an aerated solution of the heat transfer fluid at 88° C. for two weeks.
4. Susceptibility to Biological Fouling—particularly preferred heat transfer fluid compositions in accordance with the present invention were tested using a repeat challenge testing methodology in which samples of the heat transfer fluid (50 g) were inoculated with microorganisms on a weekly basis for a 6 week period. A mixed suspension (0.2 ml, $10^{10}$ cfu/ml) containing a mixture of gram positive and gram negative bacteria, moulds and yeast was used to inoculate the samples. The extent of growth in each sample was determined each week by streaking both TS-agar and SA-agar nutrient media with the samples and incubating for 3 days at 25° C.
5. Freeze Point—the freeze points of particularly preferred heat transfer fluid compositions in accordance with the present invention were compared using differential scanning calorimetry (DSC). The DSC detects the melting point of the tested dilution. Under ideal conditions the melting point will also be equal to the freezing point of the substance. However, as freezing is a kinetically driven process the actual freezing point may be lower than the melting point. In consequence it can be concluded that for the dilutions tested freezing can, in principle, occur at any temperature below the recorded melting point, as will be appreciated by the person skilled in the art.
6. Hydraulic Efficiency—The pressure drop per 100 meters of pipe of fixed diameter at 0° C. caused by the optimised composition at turbulent flow (Reynold number=5000) was calculated using a standard engineering equations 1-3, recited below, $$F=(5000 \times B)/(A \times E) \qquad \text{eq 1}$$

$$C=[F \times (\pi D^2)] \times 1000 \qquad \text{eq 2}$$

$$\text{Pressure Drop per 100 meter}=[0.0791 \times (A \times C2/100)]/[5000^{1/4} \times (\pi^2 \times D^5)] \qquad \text{eq 3}$$

Parameters;
A=Fluid Density ($kgm^{-3}$)
B=Dynamic Viscosity (Pa·S)
C=Volumetric Flow Velocity ($Ls^{-1}$)
$R_e$ (Reynolds Number)=5000
D=Pipe Radius (m)
E=Pipe Diameter (m)
F=Mean Velocity ($ms^{-1}$)
7. pH Stability—The pH stability of particular preferred heat transfer fluid compositions in accordance with the present invention were assessed using thermal storage experiments in which dilutions of the compositions were heated to 80° C. and the pH changes monitored routinely using a pH electrode over 2 weeks.

Abbreviations

The following abbreviations are used herewith;
MEG—Monoethylene glycol
MPG—Monopropylene glycol
PDO—Bio-derived or petrochemical derived propane-1,3-diol
HTF—Heat transfer fluid
Reference Solutions Standard MPG, MEG and PDO based heat transfer fluid compositions were used as reference solutions. In each case these were 93% w/w MPG/MEG/PDO and 7% w/w water.

EXAMPLES

FIG. 1 details formulations to be tested to demonstrate the benefits of a HTF composition according to embodiments of the present invention and a number of comparative examples, as described in further detail below.

In FIG. 1 the corrosion inhibitor solution comprises the sodium salt of iso-nonanoic acid (35% w/w), disodium sebacate (5.7% w/w), tolytriazole (1.0% w/w) and benzotriazole (0.37% w/w) adjusted to a pH pf 9.5-10.5 using sodium hydroxide solution.

Composition Stability

For a HTF composition comprising a dual freeze point depressant and viscosity reducing agent, it is preferable that the viscosity reducing agent remains in solution over a wide temperature range and that precipitation of solids, that would coat heat exchangers leading to a drop in efficiency and degrade elastomeric seals and cause leaks, is avoided. The stability of the example compositions prepared (as detailed in Table 1) were assessed in terms of turbidity and the presence of un-dissolved solids at both room temperature and at −10° C. The results of this study are shown in Table 2.

TABLE 2

Composition Stability

| Composition Number | Appearance at Room Temperature | Appearance at −10° C. |
|---|---|---|
| KF001 | ++ | ++ |
| KF002 | ++ | ++ |
| KF003 | ++ | ++ |
| KF004 | ++ | ++ |
| KF005 | ++ | ++ |
| KF006 | ++ | +− |
| KF007 | +− | −− |
| KF008 | +− | −− |
| KF009 | ++ | −− |
| KF010 | ++ | ++ |
| KF011 | ++ | ++ |
| KF012 | ++ | ++ |
| KF013 | ++ | ++ |
| KF014 | ++ | ++ |
| KF015 | ++ | ++ |
| KF016 | ++ | ++ |

++ Clear
+− Opaque
−− Undissolved Solid Present

Compositions using potassium formate alone as a viscosity reducing agent at various levels showed very good composition stability with the solutions remaining clear and free from un-dissolved solids over the temperature range examined. Incorporation of either sodium acetate or sodium propionate in the compositions led to decreased stability. In the case of compositions KF007 and KF009 where a higher concentration of sodium propionate was utilised, significant difficulties with keeping the salt in solution were observed, particularly at low temperatures. As such the use of potassium formate is preferred.

Compositions shown to be clear in appearance at room temperature were tested for corrosion protection according to the ASTM D1384-05/ASTM-D3306-10 test methods. The results of this testing is summarised in Table 3 below.

Corrosion Protection

For a low viscosity HTF composition to provide long term corrosion protection for a variety of metal and mixed metal systems it is crucial that the protection offered by the HTF is measured using a standard corrosion testing protocol. Furthermore, with potassium formate, sodium acetate and propionates known to be corrosive to metals, incorporation of these as viscosity reducing agents in a low viscosity HTF composition would be expected to decrease the corrosion protection offered by the HTF. Various compositions (as detailed in Table 1), containing different ratios of corrosion inhibitors, viscosity reducing agents and a dual freeze point depressant and corrosion inhibitor were tested according to the industry standard corrosion test (ASTM-D1384-05).

TABLE 3

Corrosion Testing Results

| Composition | Cast iron | Cast Aluminium | Mild Steel | Copper | Brass | Soft Solder |
|---|---|---|---|---|---|---|
| KF001 | xx | Xx | xx | x+ | x+ | xx |
| KF002 | xx | Xx | xx | x+ | x+ | xx |
| KF003 | xx | Xx | xx | x+ | x+ | xx |
| KF004 | ++ | ++ | ++ | ++ | ++ | ++ |
| KF005 | xx | Xx | xx | x+ | x+ | xx |
| KF006 | ++ | ++ | ++ | ++ | ++ | ++ |
| KF010a | xx | x+ | xx | x+ | x+ | x+ |
| KF010b | ++ | ++ | ++ | ++ | ++ | ++ |
| KF012 | xx | Xx | xx | x+ | x+ | x+ |
| KF013 | xx | Xx | xx | x+ | x+ | x+ |
| KF014 | xx | Xx | xx | x+ | x+ | x+ |
| KF015 | xx | Xx | xx | x+ | x+ | x+ |
| KF016 | xx | Xx | xx | x+ | x+ | x+ |

2. ++ Coupon Mass Loss within Specification,
x+ Coupon mass loss >20 mg <50 mg,
xx Coupon mass loss >50 mg The results of this corrosion testing showed that if potassium formate is to be used as a viscosity reducing agent and the composition is to pass the ASTM-D1384-05/ASTM-D3306-10 corrosion testing standard, glycerol should preferably be included in the composition. For example, replacing the glycerol component in KF004 with either MPG or PDO or a mixture thereof (KF001-KF003) leads to a significant loss in corrosion protection. Furthermore, the results show that replacement of potassium formate with sodium acetate as the viscosity reducing agent does enable the glycerol component of the composition to be replaced with MPG and still retain corrosion protection meeting the ASTM standard (KF006). However, this comes at the expense of both composition stability (Table 2) and viscosity due to the higher viscosity of sodium acetate solutions compared to those of potassium formate. The selection of constituent parts of the HTF composition may depend on the system in which it is intended to be used, and the duration of use in the said system.

Replacing all or part of the glycerol component with PDO may be advantageous as this may lead to a reduction in viscosity due to the fact that PDO is less viscous than glycerol on a % w/w basis. Where potassium formate is used as a viscosity reducing agent, replacement of part of the glycerol content with PDO does provide a composition that passes the ASTM standard. However, by comparing the corrosion testing results from compositions KF010a and KF010b, this was shown only to be the case when sulfamic acid was also included in the composition. The failures in the corrosion testing shown by compositions KF012 and KF013 demonstrates that sulfamic acid is most effective in combination with glycerol. Furthermore, the failures in corrosion testing on compositions KF014, KF015 and KF016 have shown that the ratio of glycerol to potassium formate can be important in terms of corrosion protection regardless of the presence of sulfamic acid.

Freeze Protection

For a low viscosity HTF to be a suitable replacement for either an MEG based HTF or an MPG based HTF, it must provide comparable or better freeze protection in circulation. The total freeze protection offered by a HTF will depend, largely, upon the total % w/w content of freeze point depressant. In compositions KF004 and KF010b the freeze point depressants are glycerol, potassium formate and PDO. The total % w/w content of freeze point depressant in K4004 and KF010b is 82.6 and 84.5% w/w respectively. The total freeze point depressant content of the reference MPG based HTF is 93% w/w.

The freeze protection offered by compositions KF004 and KF010b was investigated using differential scanning calorimetry (DSC). The DSC detects the melting point of the dilutions. Under ideal conditions this will also be equal to the freezing point of the substance. However, as freezing is a kinetically driven process the actual freezing point may be lower than the melting point. In consequence it can be concluded that for the dilutions listed above freezing can, in principle, occur at any temperature below that listed.

The data in Table 4 shows that despite the lower % w/w content of freeze point depressant, the freeze protection offered by KF004 is essentially equivalent to that of a reference MPG based HTF at dilutions of 40% v/v and below. At concentrations greater than 40% v/v an MPG based HTF offers better freeze protection. Surprisingly, the freeze protection offered by KF010b is generally better than that offered by an MPG based HTF despite its lower freeze point depressant load. Furthermore, at concentrations greater than 40% v/v, no melting point was detected at all down to –80° C. for KF010b. This DSC profile indicates that for dilutions greater than 40% v/v, no significant quantities of solid ice are formed at temperatures down to –80° C. For a heat transfer fluid this is significant as it indicates that a pipe bursting effect is unlikely to be observed with KF010b in application at >45% v/v and on exposure to extremely low temperatures.

TABLE 4

Freeze Point Comparison KF004/KF010b

| % v/v | KF004 DSC Melting Point/° C. | KF010b DSC Melting Point/° C. | Reference MPG Based HTF Melting Point/° C. |
|---|---|---|---|
| 20 | −5.51 | −5.40 | −5.26 |
| 30 | −10.10 | −11.34 | −10.66 |
| 40 | −17.56 | −18.68 | −18.95 |
| 45 | −19.15 | Not Detected | −24.72 |
| 50 | −23.09 | Not Detected | −28.57 |

Viscosity Studies

The viscosity profiles of the example compositions that showed the most favourable corrosion testing data and composition stability were determined. This data is presented in Table 5. In each case the data was obtained on a 40% v/v dilution of the composition. As a reference, the viscosity profile of a typical MPG based HTF is also presented. The viscosity profile of compositions was determined at a range of temperatures using an Anton-Parr viscometer. 40% v/v dilutions (10 ml) were injected into the Anton-Parr viscometer and the viscosity and density recorded at a range of temperatures.

TABLE 5

Viscosity Comparison

| Temperature/ ° C. | KF004 Dynamic Viscosity (mPa · S) | KF010b Dynamic Viscosity (mPa · S) | Reference MPG Based HTF Dynamic Viscosity (mPa · S) |
|---|---|---|---|
| 20 | 4.04 | 3.27 | 4.32 |
| 10 | 5.64 | 4.59 | 6.78 |
| 0 | 8.46 | 6.82 | 11.14 |
| −10 | 13.90 | 10.89 | 21.16 |
| −20 | 24.90 | 19.38 | 45.35 |

As would be expected, replacement of a more viscous component in a composition (such as MPG), with a less viscous component such as potassium formate and or PDO in compositions KF004 and KF010b does lead to a reduction in viscosity compared to a standard MPG based HTF. Replacement of the PDO in KF010b with MEG was examined as a means of further improving the viscosity profile. MEG, on a % w/w basis, is of lower viscosity than PDO. In consequence it was anticipated that the viscosity of KF010b could be reduced by using MEG in the composition. The data in Table 6 shows the viscosity data on a 50% v/v solution of both KF010b and a composition in which the PDO is replaced with MEG (KF011).

TABLE 6

KF010/KF011 Viscosity Comparison

| Temperature/ ° C. | KF010b Dynamic Viscosity (mPa · S) | KF011 Dynamic Viscosity (mPa · S) |
|---|---|---|
| −5 | 13.38 | 11.24 |
| −10 | 17.46 | 17.81 |
| −15 | 23.36 | 23.52 |
| −20 | 30.98 | 32.31 |

Surprisingly, replacement of PDO with MEG in composition KF010b did not lead to the expected improved viscosity profile. At low temperatures the viscosity of composition KF011 was higher than that of KF010b. This indicates that an interaction between the three main components in composition KF010b, rather unexpectedly, is responsible for some of the drop in viscosity rather than the drop in viscosity being solely due to the replacement of some of the more viscous components (glycerol, MPG or PDO) with some of the less viscous components (potassium formate and monoethylene glycol). That is to say, there is an unexpected synergistic effect on viscosity profile, in a HTF composition comprising glycerol, potassium formate, and PDO.

Further studies on the viscosity profile, and hydraulic efficiency of optimised composition KF010b were conducted and compared to the standard MPG, PDO, glycerol and MEG based HTF's. The data was obtained using dilutions of the three HTF compositions that provide freeze protection to −30° C.

As shown by FIG. 2 the composition with the closest viscosity profile to the standard MEG based HTF is KF010b. In order to compare the hydraulic efficiency of a standard MEG, MPG and KF010b dilutions providing freeze protection to −15° C. a series of calculations were conducted to determine the pressure drop per 100 m of pipe of fixed diameter with a Reynolds number of 5000. This data is shown in table 7.

TABLE 7

Hydraulic Calculations

|  | Dynamic Viscosity | Flow Rate (m/s) | Pressure Drop per 100 m (kPa) |
|---|---|---|---|
| MEG Reference | | | |
| HTF 30% v/v | 4.5 | 0.540 | 14.6 |
| KF010b 35% v/v | 5.5 | 0.573 | 16.9 |
| MPG Reference | | | |
| HTF 35% v/v | 8.7 | 1.050 | 53.9 |

Calculations are based on dilutions of the HTF providing freeze protection to −15° C. flowing through 40 mm diameter pipe at 0° C. with a Reynolds number of 5000.

The data in Table 7 shows that for a given pipe diameter, KF010b will require a lower flow rate and develop a significantly lower pressure drop compared to the reference MPG based HTF at turbulent flow. The data in Table 7 shows that KF010b has a hydraulic performance much more akin to that of an MEG based HTF than an MPG based HTF. In consequence, replacement of an MPG based HTF with KF010b increases the heat transfer efficiency of a system and reduces the energy used to pump the HTF. Furthermore, systems designed to operate with KF010b instead of an MPG based HTF can use smaller pumps and piping of smaller diameter leading to an overall cost saving.

Biological Fouling

Biological fouling of a HTF can lead to fluid degradation, pH changes, an increase in viscosity and a loss of efficiency and corrosion. Any low viscosity HTF must demonstrate equivalent or improved resistance to biological fouling compared to standard MPG, MEG or PDO based HTFs. With optimised composition stability, corrosion protection, viscosity and toxicity profiles observed with compositions KF010B and KF004 the susceptibility of the compositions to biological fouling was examined next. With both compositions containing glycerol, which is known to be susceptible to biological fouling, it is anticipated by the skilled person that compositions KF004 and KF010b would show less resistance to biological growth than a standard MPG based product. In order to test this prejudice repeat challenge test were conducted in which compositions were inoculated with a standard solution on a weekly basis and the extent of biological growth monitored using agar plates. The resistance to biological fouling was judged semi quantitatively using a system from − to +++, where − indicates no biological growth and +++ indicates serious growth. The type of growth (bacterial, mould or yeast) was also determined by this test method. The total duration of the test was six weeks (FIG. 3).

Surprisingly the results obtained from the testing showed that the KF004 composition (Sample B) showed a significantly higher resistance to biological fouling than a simple glycerine solution (Sample A) with biological fouling detected only after the 5$^{th}$ inoculation. As such, compositions according to the present invention overcome a prejudice in the art in relation to use of glycerol leading to unacceptable levels of biological fouling. Furthermore, further optimisation of composition KF011 by including the commercially available biocide Parmetol MBX® at 0.05% w/w makes it possible to provide equivalent biological fouling resistance as a standard MPG based HTF with the same charge of Parmetol MBX®. This is unexpected given the skilled persons understanding that glycerol is susceptible to biological fouling.

pH Stability

Changes in the pH of a HTF can lead to a decrease in the corrosion protection offered by the HTF and accelerate degradation of the HTF. Glycerol, present in both compositions KF004 and KF0010b, is known to be chemically less stable and more susceptible to degradation at elevated temperatures than MPG, MEG or PDO. The degradation of glycerol leads to the formation of acidic compounds which in turn reduce the pH of the HTF. Optimised composition KF010b was tested for pH stability by holding a 50% v/v dilution in water of the composition at 80° C. for 2 weeks. The pH was measured before and after and this data is recorded in Table 8. In addition, compositions including a range of pH buffers were also tested and this data is also presented in Table 8. For the sake of comparison, the data obtained from a heated storage test on the standard MPG based HTF (50% v/v dilution) is also presented.

TABLE 8 pH Stability Trial

| Composition | pH At Start | pH at End | Change |
|---|---|---|---|
| Reference MPG HTF | 8.01 | 7.90 | 0.11 |
| KF010b | 7.82 | 7.23 | 0.60 |
| KF010b + 0.5% w/w Triethanolamine | 8.84 | 8.77 | 0.07 |
| KF010b + 1.0% w/w Triethanolamine | 8.95 | 8.89 | 0.06 |
| KF010b + 0.5% w/w Morpholine | 8.76 | 8.68 | 0.08 |
| KF010b + 1.0% w/w Morpholine | 8.89 | 8.74 | 0.15 |

The data in Table 8 shows that composition KF010b is more susceptible to changes in pH than the reference MPG based HTF. However, incorporation of a suitable pH buffer such as triethanolamine or morpholine between 0.5-1.0% w/w leads to a significant improvement in the pH stability of the composition. The importance of pH stability in use will depend on the application or system the HTF is to be used in, and also the period of use.

Field Trial Example

To further demonstrate some of the flexibility and range of the invention, a specific formulation was made to the composition in Table 9, and a commercial field trial was performed.

TABLE 9

Field Trial Fluid (KF017) Composition

| Component | Weight % |
|---|---|
| Glycerol | 45 |
| Potassium formate (75% solution) | 45 |
| Inhibitor additives | 9.7 |
| Benzotriazole (0.04), tolyltriazole (0.1), sulphamic acid (0.6), sebacic acid (0.3), trimethylhexanoic acid (2.34), water (5.0), sodium hydroxide (0.86), triethanolamine (0.47) | |
| Dye/water | 0.3 |

Figure 4:
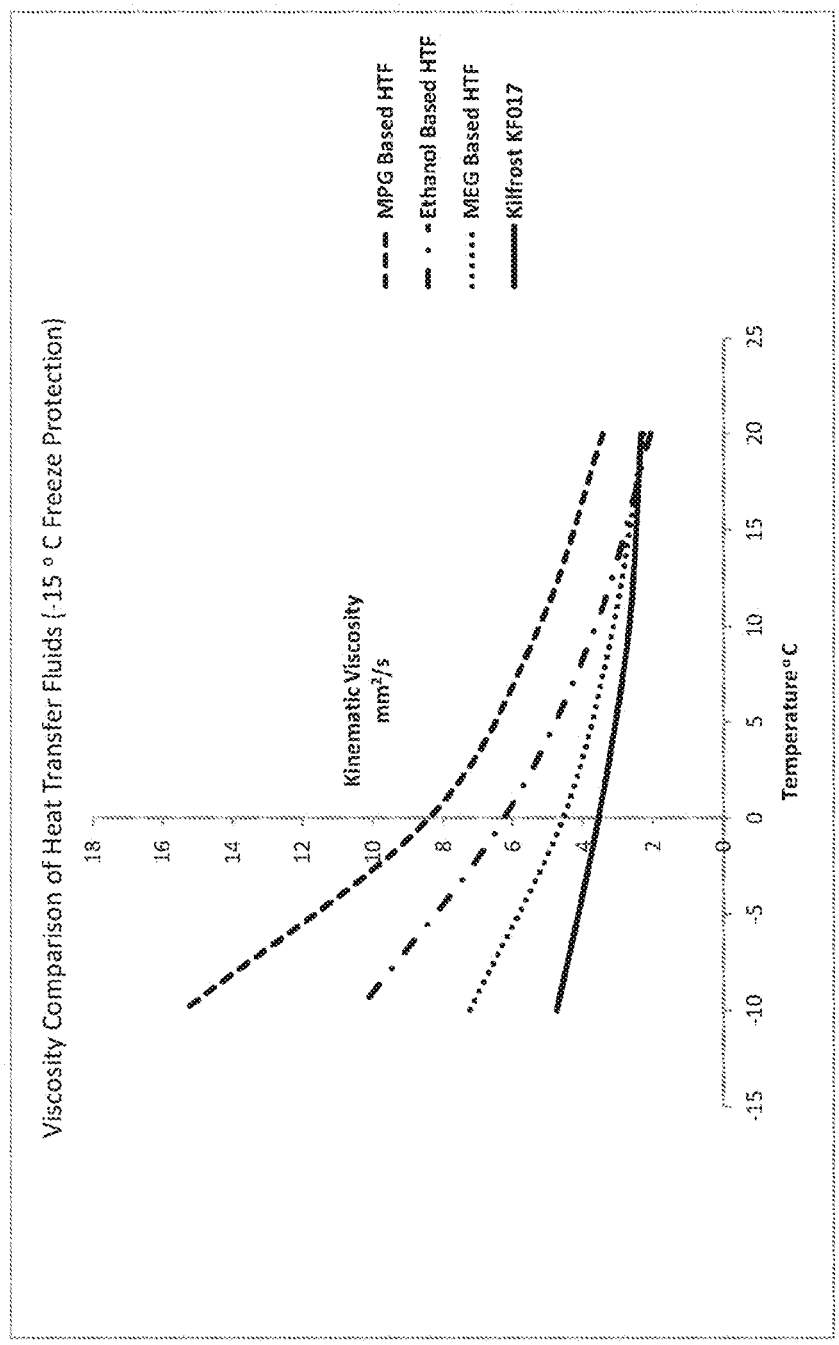
FIG. 4 is a graph showing kinematic viscosity of several heat transfer fluids.

The KF017 formulation was diluted to a freeze point of −15° C., and the viscosity of the mixture compared to typical heat transfer fluids at the same freeze point protection. The lower viscosity of KF017 when compared to these fluids, and in particular a typical MEG fluid, is shown in FIG. 4.

Corrosion protection was recorded as shown in Table 10.

TABLE 10

Corrosion testing of KF017

| Metal | Mass loss/gain (mg) | ASTM-D1384-05/ASTM-D3306-10 Mass loss/gain Limit (mg) |
|---|---|---|
| Cast aluminium | −13.5 | 30 max |
| Cast iron | +7.5 | 10 max |
| Mild steel | <1.0 | 10 max |
| Soft solder | +25.0 | 30 max |
| Copper | <1.0 | 10 max |
| Brass | <1.0 | 10 max |

Detail of the Field Trial with KF017

KF017 was trialled in a direct substitution test against a typical commercial MPG product (Dowcal™ N). The equipment it was tested on was a chocolate manufacturing line built by MacIntyre Chocolate Systems Limited of Arbroath, Angus, Scotland. The unit was installed by McIntyre and operated by Universal Robina Corporation based in the Philippines. The molten product moves between rollers which are chilled to form an initial skin on the surface of the chocolate. Ideally, this will happen in such a way that this chilling forms a barrier to resist deformation during further processing, but also leaves the chocolate pliable enough to aid its movement along the rollers before a final chilling stage. The line had been designed to produce a maximum of 500 kg of chocolate lentils per hour, but was restricted in its performance and was only able to produce around 250 kg per hour at best. Frequent cutting out of the chiller implied that the need to reach an operating temperature of −25° C. was being hampered by the viscosity of the incumbent product.

KF017 was diluted with deionised water to a freeze point of −36° C., giving an effective operating temperature of about −30° C. (allowing for a 6° C. freeze point buffer). The system was drained of the Dowcal™ N product, flushed clean, and the fluid replaced with the diluted KF017. During the initial trial work, the system delivered an increased operating rate of 360 kg per hour—an increase in the production rate of 44% and there were no stoppages due to equipment cut-out. A pumping problem was noticed that appeared to be the result of cavitation in the fluid from foam issues. While this foam issue was addressed, the system was returned to standard manufacture using the Dowcal™ N, and production dropped back to the 250 kg per hour rate with frequent cut-out.

For the second trial with KFD017 plus a small addition of antifoam (Xiameter AFE-1510), a similar dilution as described above was used. There were no further pumping issues with this formulation. After a steady increase in rate during this second trial phase, the production was able to be ramped up to and maintained at its design capacity (500 kg per hour) with KF017, representing a 100% increase over the previously used fluid (Dowcal™ N).

The invention claimed is:

1. A heat transfer fluid composition comprising:
   30 to 80% by weight of a corrosion inhibitor and freeze point depressant dual function agent;
   wherein the corrosion inhibitor and freeze point depressant dual function agent is at least one of glycerol, polyglycerol, trimethylglycine, sorbitol, xylitol, maltitol, and lactitol; and
   10% to 70% by weight of a viscosity reducing agent selected from potassium formate, potassium acetate, potassium propionate, and mixtures thereof; and
   wherein the composition does not comprise a diol selected from one or more of propane-1,3-diol (PDO), propane-1,2-diol(MPG), ethylene glycol (MEG), diethylene glycol (DEG), triethylene glycol (TEG), dipropylene glycol (DPD), or tripropylene glycol.

2. The composition according to claim 1, wherein the corrosion inhibitor and freeze point depressant dual function agent is glycerol.

3. The composition according to claim 1 wherein the viscosity reducing agent is potassium formate.

4. The composition according to claim 1, further comprising a sulfamic acid salt.

5. The composition according to claim 4, comprising from 0.1% to 5% by weight of the sulfamic acid salt.

6. The composition according to claim 1, comprising from 25 to 50% by weight of the viscosity reducing agent.

7. The composition according to claim 1, further comprising at least one corrosion inhibitor.

8. The composition according to claim 7, comprising from 1% to 15% by weight of the corrosion inhibitor.

9. The composition according to claim 7, wherein the corrosion inhibitor comprises at least one of:
   a. a yellow metal protector selected from the group consisting of a triazole derivative, benzotriazole, tolytriazole, mercaptobenzotraizole, and mixtures thereof,
   b. a first ferrous metal corrosion inhibitor selected from the group consisting of a long chain carboxylic acid salt, decanedioic acid (sebacic acid), octanoic acid (caprylic acid), nonanoic acid (pelargonic acid), isononanoic acid, 2-ethyl hexanoic acid, benzoic acid, and mixtures thereof,
   c. a second ferrous metal corrosion inhibitor selected from the group consisting of a mineral inhibitor, nitrate salts, nitrite salts, dipotassium phosphate, and mixtures thereof, or
   d. an aluminium metal corrosion inhibitor selected from the group consisting of a pH buffer, a secondary amine, a tertiary amine, long chain carboxylic acids, secondary or tertiary amine salts, and mixtures thereof.

10. The composition according to claim 1, further comprising a pH control agent.

11. The composition according to claim 10, wherein the pH control agent is at least one of sodium hydroxide and potassium hydroxide.

12. The composition according to claim 1, further comprising triethanolamine.

13. The composition according to claim 1, further comprising a biocide.

14. The composition according to claim 13, wherein the biocide is at least one of benzisothiazolone, methylisothiazolinone, and bis(3-aminopropyl)dodecylamine.

15. The composition according to claim 1, wherein the corrosion inhibitor and freeze point depressant dual function agent is glycerol and is present in an amount of 30-80% by weight;
   wherein the viscosity reducing agent is potassium formate and is present in an amount of 10-70% by weight and is in the form of a 75% potassium formate aqueous solution; and
   wherein the composition further comprises:
   0.1-5% by weight of sulfamic acid;
   1-15% by weight of corrosion inhibitors;

0-2% by weight of triethanolamine;

0-10% by weight a pH control agent; and 0-0.4% by weight of a biocide.

16. The composition according to claim 1, wherein the corrosion inhibitor and freeze point depressant dual function agent is glycerol and is present in an amount of 30-70% by weight;

wherein the viscosity reducing agent is potassium formate and is present in an amount of 25-50% by weight and is in the form of a 75% potassium formate aqueous solution; and wherein the composition further comprises:

0.1-2% by weight of sulfamic acid;

2-10% by weight of corrosion inhibitors;

0.1-2% by weight of triethanolamine;

0-10% by weight a pH control agent; and 0-0.4% by weight of a biocide.

17. The composition according to claim 1, having a pH of between 8.5 and 9.5.

18. The composition according to claim 1, further comprising a scale reducer.

19. The composition according to claim 1, further comprising a thermal stabiliser.

20. An aqueous based heat transfer fluid product, comprising the heat transfer fluid composition of claim 1 and water.

21. The product according to claim 20, comprising from 20% and 60% by volume of the heat transfer fluid composition.

22. A heat transfer fluid composition comprising:

20-80% by weight of a corrosion inhibitor and freeze point depressant dual function agent selected from the group consisting of glycerol, polyglycerol, trimethylglycine, sorbitol, xylitol, maltitol, and lactitol; and 10-25% by weight of a viscosity reducing agent selected from the group consisting of potassium formate, potassium acetate, potassium propionate, and mixtures thereof; and between 10% to 35% by weight of a diol.

23. The composition of claim 22, wherein the viscosity reducing agent is potassium formate.

24. The composition according to claim 22, wherein the corrosion inhibitor and freeze point depressant dual function agent is glycerol.

25. The composition according to claim 22, further comprising a sulfamic acid salt.

26. The composition according to claim 22, wherein the diol is at least one of propane-1,3-diol, propane-1,2-diol, ethylene glycol, diethylene glycol, triethylene glycol, dipropylene glycol, and tripropylene glycol.

27. The composition according to claim 22, further comprising a corrosion inhibitor.

28. The composition according to claim 22, further comprising a pH control agent.

29. The composition according to claim 22, further comprising a biocide.

30. An aqueous based heat transfer fluid product, comprising the heat transfer fluid composition of claim 22 and water.

31. The product according to claim 30, comprising from 20% and 60% by volume of the heat transfer fluid composition.

32. A heat transfer fluid composition comprising:

30-40% by weight of glycerol;

10-25% by weight of a 75% potassium formate aqueous solution;

20-35% by weight of propane-1,3-diol;

0.5-2% by weight of sulfamic acid in the form of a sulfamic acid salt;

3-6% by weight of corrosion inhibitors;

0.1-2% by weight of triethanolamine;

8.5-10% by weight of a pH control agent; and 0.1-0.4% by weight of a biocide.

* * * * *